US008469568B2

(12) United States Patent
Ohno

(10) Patent No.: US 8,469,568 B2
(45) Date of Patent: Jun. 25, 2013

(54) VEHICLE LIGHT

(75) Inventor: Masafumi Ohno, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 381 days.

(21) Appl. No.: 12/793,317

(22) Filed: Jun. 3, 2010

(65) Prior Publication Data

US 2010/0309681 A1 Dec. 9, 2010

(30) Foreign Application Priority Data

Jun. 3, 2009 (JP) ................................ 2009-134163

(51) Int. Cl.
*B60Q 1/04* (2006.01)

(52) U.S. Cl.
USPC ............................ 362/545; 362/538; 362/507

(58) Field of Classification Search
USPC ................................. 362/538, 543, 544, 545
See application file for complete search history.

(56) References Cited

U.S. PATENT DOCUMENTS

| | | | | |
|---|---|---|---|---|
| 7,077,552 | B2 * | 7/2006 | Ishida | 362/545 |
| 7,168,836 | B2 * | 1/2007 | Tatsukawa | 362/538 |
| 7,387,417 | B2 * | 6/2008 | Sazuka et al. | 362/544 |
| 7,484,872 | B2 * | 2/2009 | Yatsuda et al. | 362/545 |
| 2007/0047250 | A1 | 3/2007 | Kinoshita | |

FOREIGN PATENT DOCUMENTS

| | | | |
|---|---|---|---|
| JP | 11-273407 | A | 10/1999 |
| JP | 2005-141919 | A | 6/2005 |
| JP | 2007-59162 | A | 3/2007 |
| JP | 2008-78086 | A | 4/2008 |

* cited by examiner

*Primary Examiner* — Peggy A. Neils
(74) *Attorney, Agent, or Firm* — Kenealy Vaidya LLP

(57) ABSTRACT

A vehicle light having a plurality of optical units utilizing a semiconductor light emitting device as a light source can effectively prevent or suppress illuminance unevenness. One example of such a vehicle light can be a vehicle headlamp that includes four optical units each having a semiconductor light emitting device as a light source. The optical units can be arranged in line in the vehicle width direction so as to prevent the luminance unevenness, which can otherwise be generated due to a gap between optical units disposed in a vertical two-stage arrangement.

11 Claims, 18 Drawing Sheets

VEHICLE LIGHT

This application claims the priority benefit under 35 U.S.C. §119 of Japanese Patent Application No. 2009-134163 filed on Jun. 3, 2009, which is hereby incorporated in its entirety by reference.

TECHNICAL FIELD

The presently disclosed subject matter relates to a vehicle light, and in particular, to a vehicle light having a plurality of optical units (lighting units) each having a semiconductor light emitting device (such as an LED) serving as a light source.

BACKGROUND ART

In recent years, various lighting fixtures utilizing a light emitting diode (LED) serving as a light source have been commercialized. LEDs can provide higher luminance, and operate with low power consumption, and accordingly, are expected to serve well as a light source for use in vehicle lights for next generation lighting applications. In Japanese Patent No. 4115921 (corresponding to U.S. Pat. No. 7,387,417), a vehicle headlamp for low beam is proposed that has LEDs serving as light sources and forms a luminous intensity distribution pattern for a low beam, as illustrated in FIGS. 1 and 2. Note that FIG. 1 is a front view of the vehicle headlamp, and FIG. 2 is a longitudinal cross-sectional view of the vehicle headlamp (taken along II-II line in FIG. 1). The vehicle headlamp 9100 in the drawings can be installed on the right side front end of a vehicle body (namely, near the opposite lane when travelling on a left lane). The vehicle headlamp 9100 includes a lamp body 9102 having a front opening, and a light-transmitting cover 9104 attached to the front opening of the lamp body 9102. The lamp body 9102 and the transparent cover 9104 can define a lamp chamber. The vehicle headlamp 9100 further includes six optical units (lighting units) 9110 and 9112 which are housed in the lamp chamber and supported by a supporting bracket 9120 so that three of them are arranged in an upper portion thereof and the remaining three of them are arranged in a lower portion (in a two-stage arrangement).

The light-transmitting cover 9104 is attached to the lamp body 9102 so as to cover the entire front opening of the lamp body 9102. In the lamp chamber, an inner panel 9106 is provided along the light-transmitting cover 9104. The inner panel 9106 has cylindrical openings 9106*a* and 9106*b* at positions corresponding to the respective optical units 9110 and 9112, so that the cylindrical openings 9106*a* and 9106*b* surround the corresponding optical units 9110 and 9112.

These six optical units 9110 and 9112 can project light so as to form a light distribution pattern for low beam (a so-called passing-by beam). The optical units 9110 are disposed so as to be directed in the front direction of a vehicle body, thereby serving as lighting units for front illumination. The optical units 9112 are disposed so as to be directed sidewards in the width direction of a vehicle body by a predetermined angle with respect to the front direction, thereby serving as lighting units for sideward illumination.

Although a detailed description will be omitted here, each of the optical units 9110 for front illumination can be a projector type lighting unit, and includes: a projection lens 9132 disposed on an optical axis Ax extending in the front-to-rear direction of the vehicle body; a semiconductor light emitting device 9130 disposed on the optical axis Ax in the rear of the projection lens 9132; a reflector 9134 disposed so as to cover the semiconductor light emitting device 9130 from above; and an optical controlling member 9136 disposed between the semiconductor light emitting device 9130 and the projection lens 9132.

The semiconductor light emitting device 9130 can be a white light emitting diode having a light emission chip, for example. The light emitted from the semiconductor light emitting device 9130 upward can be reflected by the reflector 9134 to the front side near the optical axis Ax, so that the light can be projected through the projection lens 9132 in front of the optical unit 9110. The optical controlling member 9136 has a front edge 9136*a* disposed near the rear focus of the projection lens 9132. The light entering the front edge 9136*a* or lower portion of the optical controlling member 9136 can be shielded so as not to enter the projection lens 9132, thereby forming a bright/dark boundary line (cut-off line) at the upper edge of the light distribution pattern formed by the light projected slightly downward from the projection lens 9132.

The optical unit 9112 for sideward illumination can be a reflector-type (parabola-type) lighting unit, and includes three semiconductor light emitting devices 9150 arranged in the vehicle width direction, and a parabolic cylinder-like reflector 9152 disposed below these semiconductor light emitting devices 9150.

The semiconductor light emitting device 9150 can be a white light emitting diode having a light emission chip, for example. The light emitted from the semiconductor light emitting device 9150 downward can be reflected by the reflector 9152 to the front side, so that the light can be projected in front of the optical unit 9112. As the reflecting surface of the reflector 9152 is constituted by the parabolic cylinder-like surface and directed slightly downward, the projected parallel light is directed slightly downward in the vertical direction, but the light can be diffused in the lateral direction.

SUMMARY

When using only a single optical unit utilizing a semiconductor light emitting device as a light source the device may not project light with sufficient illuminance in a wide area. Accordingly, conventional vehicle lights have utilized a plurality of such optical units arranged vertically and laterally so that a light distribution pattern with required or desired illuminance is formed.

However, there is a problem in that illuminance unevenness (light distribution unevenness) may occur in the vehicle light having a plurality of optical units arranged vertically and laterally. As in Japanese Patent No. 4115921 (corresponding to U.S. Pat. No. 7,387,417), the optical units are arranged in the upper and lower portions (two-stage arrangement) and a space is formed between them. Similar to FIG. 2, FIG. 3 is a longitudinal cross-sectional view illustrating another conventional configuration including the upper optical units 9110 and the lower optical units 9112. However, in this vehicle light, the respective optical units can project parallel light forward inclined by the same angle (slightly downward with respect to the horizontal direction) so that the upper edge of the bright/dark boundary line is formed. Because the height at which each of the optical units is disposed is different from each other, the synthesized light distribution pattern associated with the light from the respective optical units may include stepped differences in luminous intensity. Therefore, the performance may deteriorate, and illuminance unevenness may occur.

For example, suppose the case where a vehicle light having a plurality of optical units disposed in a vertical two-stage arrangement illuminates a virtual vertical screen 25 meters away from the vehicle light with projected light. FIG. 4 is a diagram showing a light distribution pattern in this case. The illustrated light distribution pattern can be obtained by synthesizing three light distribution sub-patterns PL1, PL2 and PL3 formed by the upper-stage optical units, and a light distribution sub-pattern PL4 formed by the lower-stage optical unit. As shown in the drawing, the light distribution sub-patterns PL1, PL2 and PL3 formed by the upper-stage optical units can form a horizontal bright/dark boundary line CL1 by the upper edge of the sub-patterns PL1, PL2 and PL3. The light distribution sub-pattern PL4 can form a horizontal bright/dark boundary line CL2 by the upper edge of the sub-pattern PL4. In this case, the bright/dark boundary line CL2 is positioned lower than the upper bright/dark boundary line CL1 by the difference of the installed position of the optical units. Accordingly, the luminous intensity distribution as illustrated in a vertical cross-section in FIG. 5 may include a minimum point where the luminous intensity is smaller than those surrounding areas. This can result in a brightness difference in the vertical luminous intensity distribution.

FIGS. 6A, 6B and 6C illustrate a luminous intensity distribution on a road. When a vehicle headlamp illuminates the road with a low beam as shown in FIG. 6A, as the illuminated point is farther from the driver's position (viewing position) as illustrated in FIG. 6B, the luminous intensity on the road is ideally decreased smoothly and gradually. When the vehicle light having a plurality of optical units disposed in a vertical two-stage arrangement is used as a vehicle headlamp, a low luminance intensity area can be locally generated in part between the nearer (closer) area and the farther (long distance) area as illustrated in FIG. 6C. When the driver observes this local low luminance intensity area, he/she might recognize that part as a bumpy road.

To cope with this, the respective optical units can be configured to project light on a common single focal point disposed on the virtual vertical screen 25 meters away from the vehicle light, thereby suppressing the above illuminance unevenness. In this case, the lower optical units inevitably project upward light, and this may result in generation of a glare light against an oncoming vehicle.

The presently disclosed subject matter was devised in view of these and other problems and features and in association with the conventional art. According to an aspect of the presently disclosed subject matter, a vehicle light having a plurality of optical units utilizing a semiconductor light emitting device as a light source can effectively suppress or prevent illuminance unevenness.

According to another aspect of the presently disclosed subject matter, a vehicle light can include a plurality of optical units utilizing a semiconductor light emitting device as a light source, wherein the respective optical units form light distribution sub-patterns that are superposed to form a light distribution pattern for low beam. The respective optical units have light emission areas arranged in a width direction of a vehicle body to project light from the respective light emission areas so that the light emission areas are not overlapped with each other in a vertical direction. The light emission areas of the optical units can be arranged so that ranges of the light emission areas as defined in a vertical direction of the light emission areas form a single range continuous in the vertical direction. In particular, the vehicle light can include only such optical units.

According to another aspect of the presently disclosed subject matter, as the light emission areas of the plurality of optical units are arranged such that they are not separated from each other in the vertical direction (or not disposed in a vertical two-stage arrangement), illuminance unevenness can be prevented and may not occur. The illuminance unevenness may otherwise have occurred due to the gap between the light emission areas in the vertical direction in a conventional vehicle light having optical units in a vertical two-stage arrangement. Furthermore, as the light emission areas of the optical units are arranged so that ranges of the light emission areas as defined in a vertical direction of the light emission areas form a single range continuous in the vertical direction, the light emitted from the respective optical units can be continuous in the vertical direction. In particular, the present configuration can connect the blurring areas near the bright/dark boundary lines of the light distribution sub-patterns for low beam formed by the respective optical unit. Accordingly, the illuminance unevenness can be suppressed and light can be gathered near the bright/dark boundary lines, thereby improving long distance visibility.

According to still another aspect of the presently disclosed subject matter, the vehicle light according to the previous aspect can be configured such that the uppermost light emission area and the lowermost light emission area out of the light emission areas of the optical units in the vertical direction can be arranged so that the ranges of these light emission areas as defined in a vertical direction of the light emission areas form a single range that is continuous in the vertical direction. In this configuration, the remaining optical units (other than the optical units having the uppermost and lowermost light emission areas) can be arranged so that the vertical ranges of the light emission areas thereof are disposed within the continuous range.

In this aspect, the light emission areas of the optical units can be arranged within a limited narrow vertical range to a degree that is more than those in the previously described aspect.

According to still another aspect of the presently disclosed subject matter, in the vehicle light according to any of the previous aspects the optical units can be arranged so that the light emission areas of the optical units are arranged in line in the width direction of the vehicle light within a vertical range limited by the uppermost light emission area and the lowermost light emission area.

In this aspect, the plurality of optical units can be configured such that the light emission areas thereof are arranged in line in the width direction of the vehicle light (in the horizontal direction). Accordingly, the light emission areas of the optical units can be arranged within a limited narrow vertical area to a degree that is more than that of the previously described aspect.

According to yet another aspect of the presently disclosed subject matter, a vehicle light having a plurality of optical units utilizing a semiconductor light emitting device as a light source can effectively prevent or suppress illuminance unevenness.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lights of the presently disclosed subject matter with reference to the accompanying drawings in accordance with exemplary embodiments.

Figure 7:
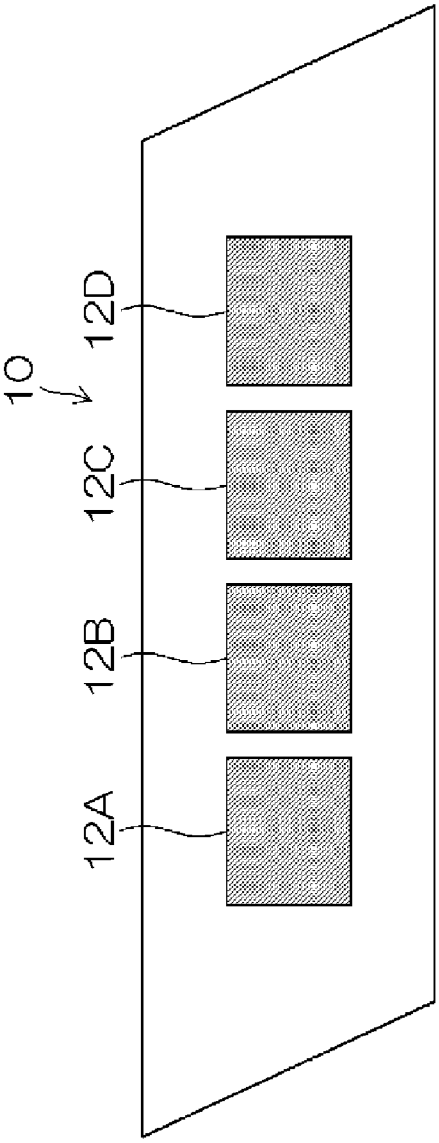
FIG. 7 is a front view illustrating an exemplary vehicle headlamp for low beam, made in accordance with the principles of the presently disclosed subject matter, showing an arrangement of the optical units according to a first exemplary embodiment.

FIG. 7 is a front view illustrating an example of a vehicle headlamp for low beam, made in accordance with the principles of the presently disclosed subject matter, showing the arrangement of the optical units according to a first exemplary embodiment. The vehicle headlamp 10 can be a light installed on a vehicle body at its front right end (near the oncoming vehicle lane of the left-hand traffic system), for example. The vehicle headlamp 10 can include optical units 12A, 12B, 12C and 12D, each of which is provided with a semiconductor light emitting device (LED) as a light source. The optical units 12A, 12B, 12C, and 12D can be arranged in the horizontal direction (in the vehicle width direction) in line and at the same horizontal level.

In the drawings, the square ranges indicating the respective optical units 12A to 12D simply describe an area where the light is projected from the respective optical units 12A to 12D. Hereinafter, the area is referred to as a light emission area. In the present exemplary embodiment, the light emission areas of all the optical units 12A to 12D are the same as each other in size (each have an equal area and shape for light emission).

Figure 1:
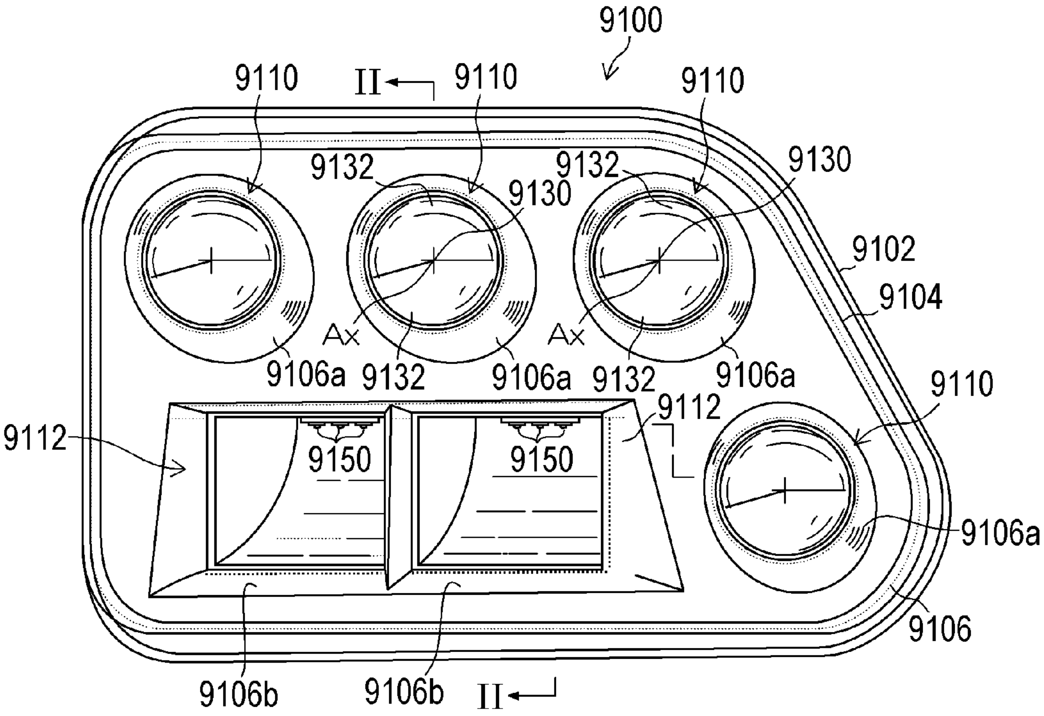
Fig. 1 Conventional Art
FIG. 1 is a front view of a conventional vehicular headlamp.
Figure 2:
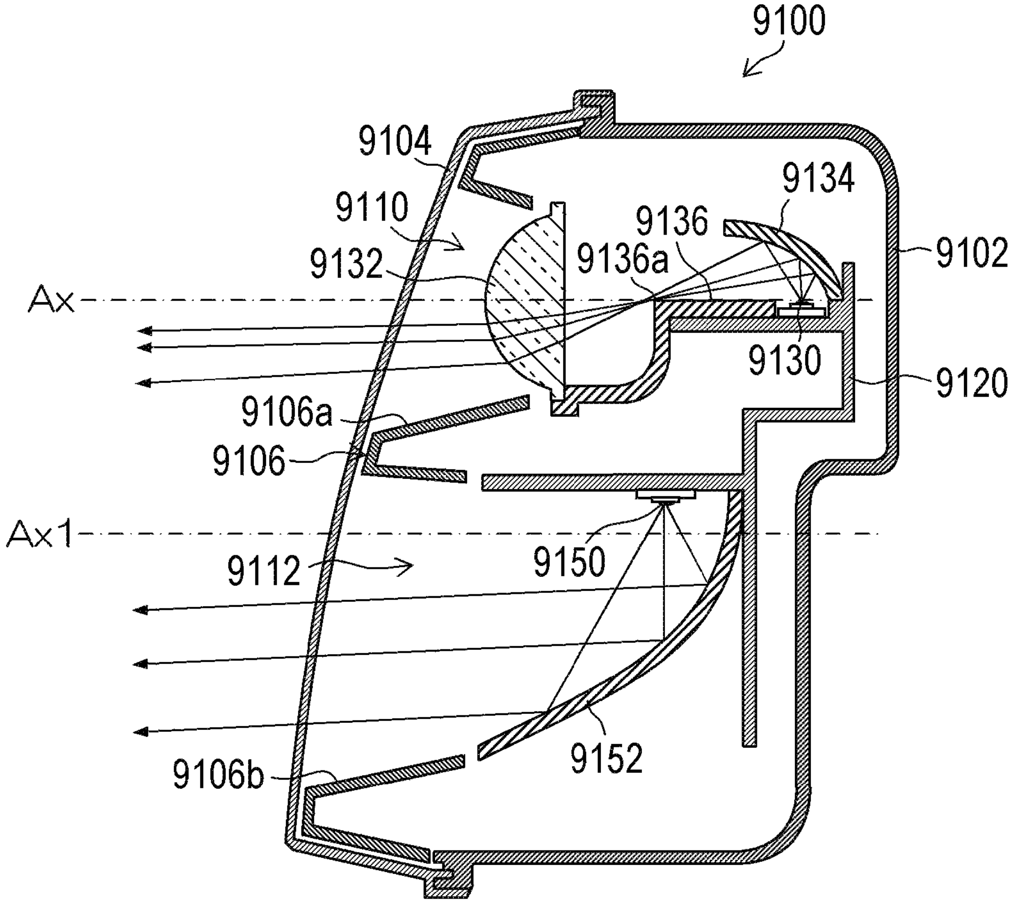
Fig. 2 Conventional Art
FIG. 2 is a longitudinal cross-sectional view of the vehicular headlamp taken along line II-II in FIG. 1.
Figure 3:
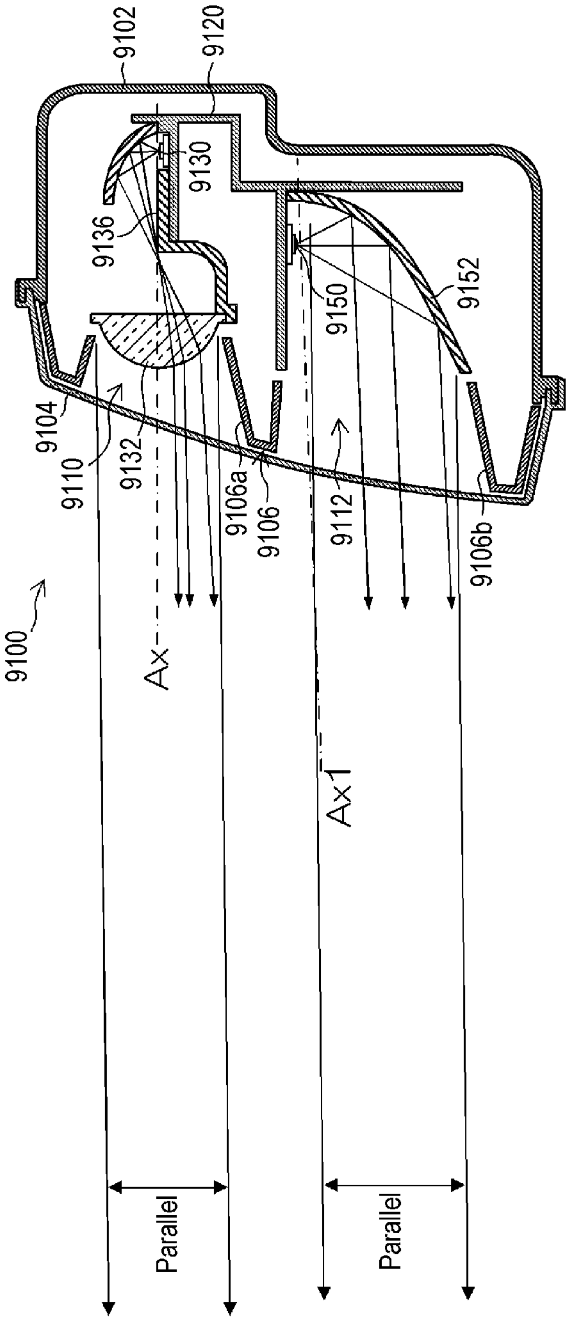
Fig. 3 Conventional Art
FIG. 3 is a longitudinal cross-sectional view illustrating another configuration of a conventional vehicle headlamp.
Figure 4:
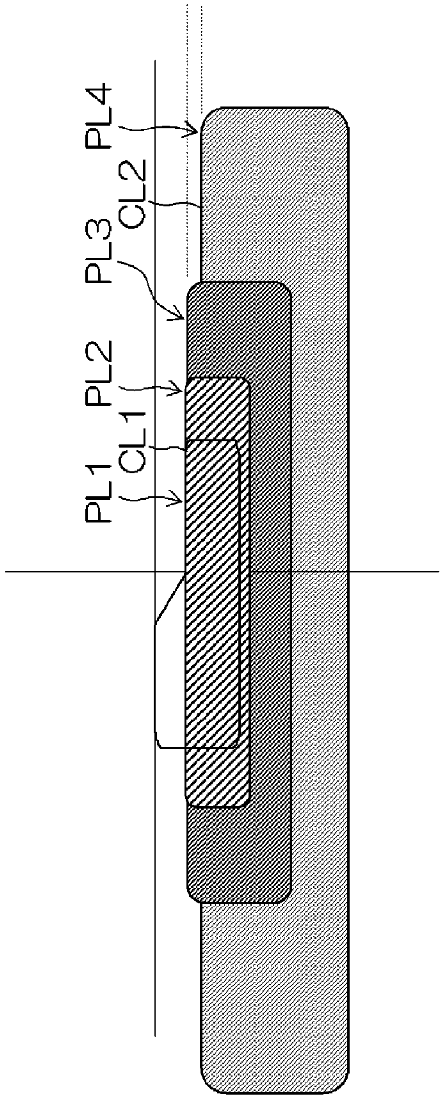
Fig. 4 Conventional Art
FIG. 4 is diagram showing a light distribution pattern that can be formed by the vehicle headlamps as shown in FIGS. 1 to 3.
Figure 5:
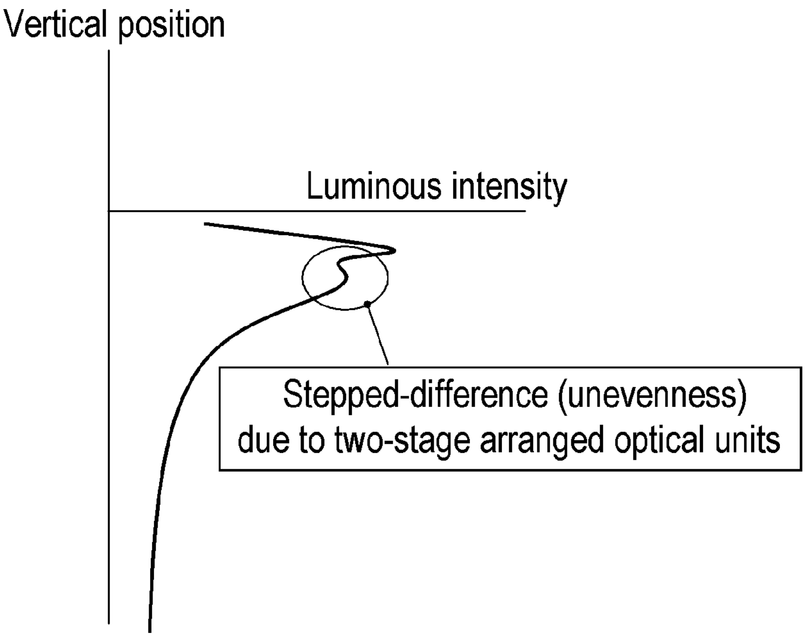
Fig. 5 Conventional Art
FIG. 5 is a diagram showing a luminous intensity distribution of the light distribution pattern of FIG. 4 in a vertical cross-section.
Figure 6:
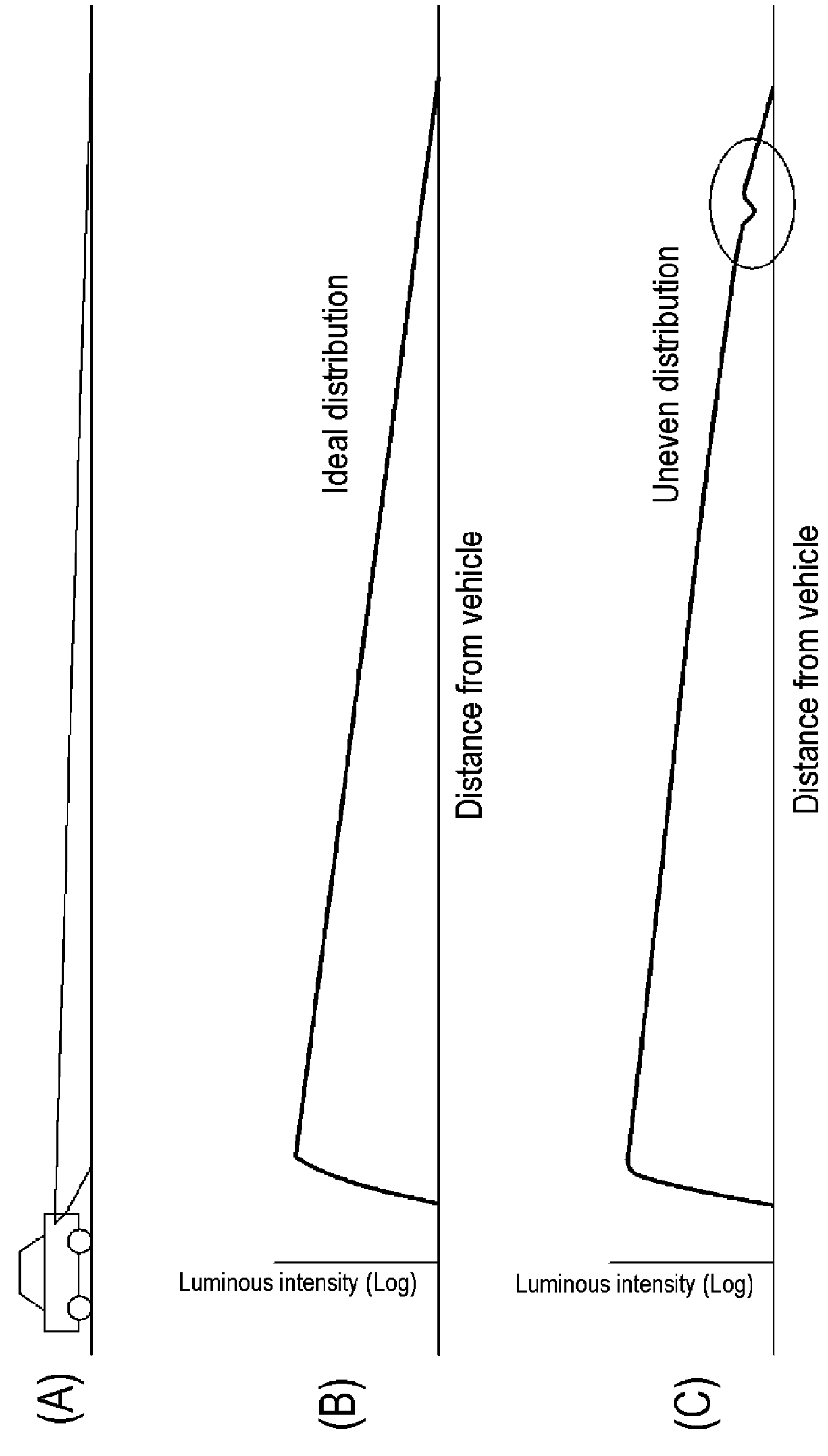
Fig. 6 Conventional Art
FIGS. 6A, 6B, and 6C illustrate a diagram showing a luminous intensity distribution of the conventional vehicle headlamp and an ideal luminous intensity distribution in a vertical cross-section.

The type of the respective optical units 12A to 12D are not limited to particular ones, but, as shown in FIGS. 1 and 2, they may be designed as a projector type optical unit 110 or a reflector type (parabolic) optical unit 112. Hereinafter, a description will be given of the projector type optical unit and the reflector type optical unit.

Figure 8:
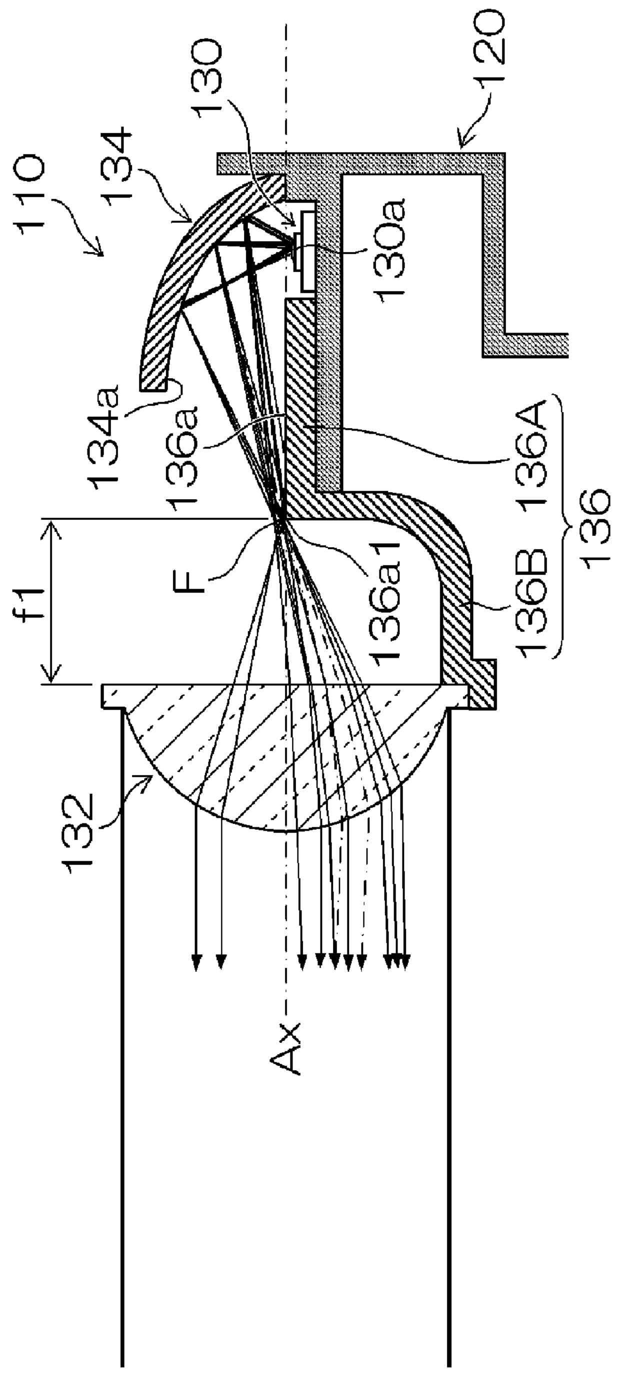
FIG. 8 is a longitudinal cross-sectional view illustrating an example of a projector type optical unit.

FIG. 8 is a cross-sectional view illustrating a projector type optical unit 110. The optical unit 110 can be supported by a supporting bracket 120. The optical unit 110 can include: a projection lens 132 disposed on the optical axis Ax, which extends in the front-to-rear direction of the vehicle body (in the front-to-rear direction of the light); a semiconductor light emitting device 130 disposed on the optical axis Ax in the rear of the projection lens 132; a reflector 134 disposed so as to cover the semiconductor light emitting device 130 from above; and an optical controlling member 136 disposed between the semiconductor light emitting device 130 and the projection lens 132.

The semiconductor light emitting device 130 can be a white light emitting diode including a square light emission chip 130*a* with one side being 0.3 to 1 mm in size. The semiconductor light emitting device 130 can be disposed such that the light emission chip 130*a* is positioned on the optical axis Ax and the light emitting direction thereof is directed upward. It should be noted that instead of a white light emitting diode, a laser diode (LD) or other known light source can be used as the light source.

The projection lens 132 can be a plano convex lens having a convex front surface and a flat rear surface, and a focal distance f1 being set to a relatively small value.

The reflector 134 can be configured so as to reflect light emitted from the semiconductor light emitting device 130 in the front direction and converge the same light substantially at the rear side focus F of the projection lens 132. Specifically, the reflection surface 134*a* of the reflector 134 can have a vertical cross section along the optical axis Ax being a substantial ellipsoid and its eccentricity can be set such that it is increased gradually from the vertical cross section toward the horizontal cross section. The reflection surface 134*a* can substantially reflect and converge the light from the semiconductor light emitting device 130 to the position slightly in front of the rear side focus F.

The optical controlling member 136 can include an optical control section 136A and a lens holder section 136B that continuously extends from the front end of the optical control section 136A forward. The upper surface 136*a* of the optical controlling member 136 can extend from the rear side focus F of the projection lens 132 rearward. The front edge 136*a*1 of the upper surface 136*a* can be a substantially arc-shaped edge along the focal plane of the rear side focus F of the projection lens 132. The upper surface 136*a* can be subjected to surface treatment such as aluminum deposition or the like, so that the upper surface 136*a* can serve as a reflection surface. Then the optical controlling member 136A can reflect, at the upper surface 136*a*, part of the light reflected from the reflection surface 134*a* of the reflector 134 so that that part of the light cannot directly travel straightforward but instead becomes upwardly directed light.

The lens holder section 136B can extend from the front end of the optical controlling member 136A downward and curve forward so as to support the projection lens 132 at its front end section.

In the thus configured optical unit 110, the semiconductor light emitting device 130 can emit light, and the light can be reflected by the reflector 134 and pass the rear side focus F of the projection lens 130. Then, the light can be substantially collimated by the projection lens 132 to be projected forward. Part of the light from the reflector 134 does not pass the rear side focus F, but can pass above the rear side focus F. This part of the light can be projected by the projection lens 132 forward but slightly downward more than the light passing the rear side focus F. This configuration can prevent light that is more upwardly direct than the light passing the rear side focus F from being projected from the optical unit 110.

Figure 9:
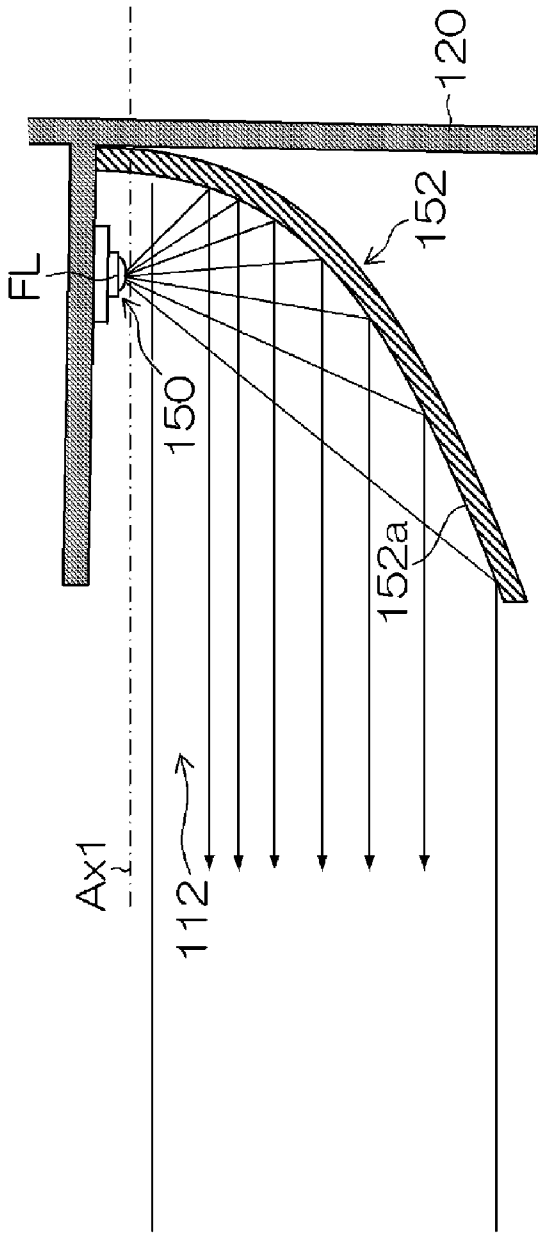
FIG. 9 is a longitudinal cross-sectional view illustrating an example of a reflector type optical unit.

FIG. 9 is a cross-sectional view illustrating a reflector type optical unit. The optical unit 112 can be supported by the supporting bracket 120. The optical unit 112 can include three semiconductor light emitting devices 150 arranged in the vehicle width direction (left-to-right horizontal direction) at predetermined intervals, and a reflector 152 can be disposed below these semiconductor light emitting devices 150.

The reflector 152 can have a reflection surface 152*a* formed of a parabolic cylindrical surface having a focal line FL extending in the vehicle width direction. At either side of the reflection surface 152*a* a side wall can be formed as a pair. The focal line FL can extend in a direction perpendicular to the center axis Ax1 of the optical unit 112. It should be noted that the center axis Ax1 can serve as an axis of a parabola constituting the vertical cross section of the parabolic cylindrical surface being the reflecting surface 152*a* of the reflector 152. The pair of side walls can be formed as vertical walls that are symmetrical with respect to the center axis Ax1 and can spread forward. The three semiconductor light emitting devices 150 can be arranged along the focal line FL at predetermined intervals. The center semiconductor light emitting device 150 can be positioned on the center axis Ax1, and the remaining semiconductor light emitting devices 150 on both sides can be disposed symmetrically with respect to the center axis Ax1. The semiconductor light emitting devices 150 can employ a white light emitting diode including a square light emission chip 150*a* with one side being 0.3 to 1 mm in size. The semiconductor light emitting devices 150 can be disposed such that the light emission chip 150*a* is positioned on the focal line FL and the light emitting direction thereof is directed downward. It should be noted that instead of a white light emitting diode, a laser diode (LD) or other known lighting device can be used as the light source.

In the thus configured optical unit 112, the three semiconductor light emitting devices 150 can emit light, and the light can be reflected by the reflector 152 so as to be projected forward as parallel light. Furthermore, the reflection surface 152*a* of the reflector can be formed of the parabolic cylindrical surface that is directed slightly downward. Accordingly, the optical unit 112 can project slightly downward parallel light in the vertical direction while with regard to the left-to-right direction the light can be diffused to both right and left sides with respect to the center axis Ax1 as a center.

It should be noted that the presently disclosed subject matter can employ the projector type optical unit and the reflector type optical unit as shown in FIGS. 8 and 9 as the optical units 12A to 12D of FIG. 7, but the disclosed subject matter is not limited thereto. Instead, a light-guide type optical unit or other type optical units with various types and configurations utilizing a semiconductor light emitting device as a light source can be used as the optical unit in the presently disclosed subject matter. The optical units constituting the present vehicle headlamp are not necessarily the same, but can be of different types from each other or can have different configurations shapes and sizes from each other.

Figure 10:
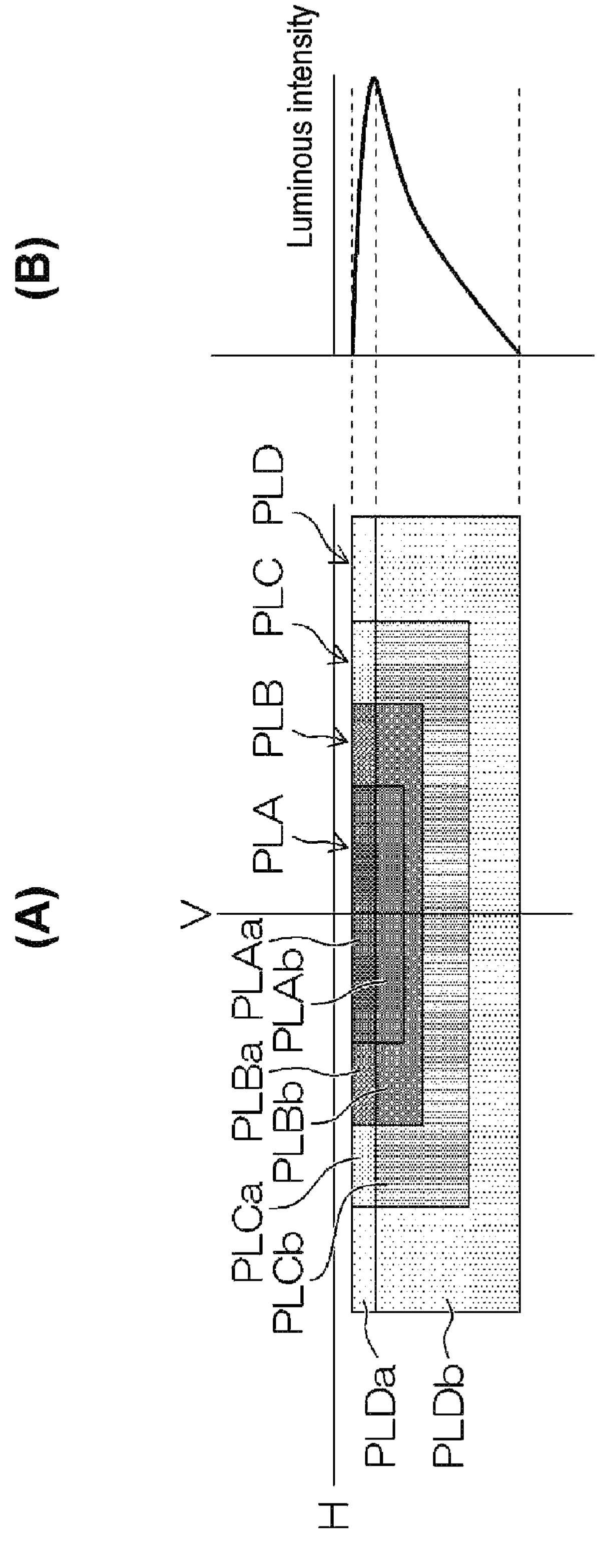
FIG. 10 is a diagram showing a light distribution pattern and a luminous intensity distribution in a vertical cross-section formed by the vehicle headlamp of FIG. 7.

FIG. 10 (A) is a diagram showing a light distribution pattern formed by light projected by the vehicle headlamp 10 of FIG. 7 on a virtual vertical screen a predetermined distance away, for example, 25 meters away, from the vehicle headlamp. The respective optical units 12A to 12D of the vehicle headlamp 10 can project light at a projection angle or less as determined by a certain regulation as a low-beam light distribution. For example, the light can be projected downward at 0.57 degrees or less with respect to the horizontal direction. Specifically, almost all the light forming the upper end area of the pattern out of the light projected by the respective optical units 12A to 12D can be controlled so as to be projected downward at 0.57 degrees with respect to the horizontal direction.

Figure 17:
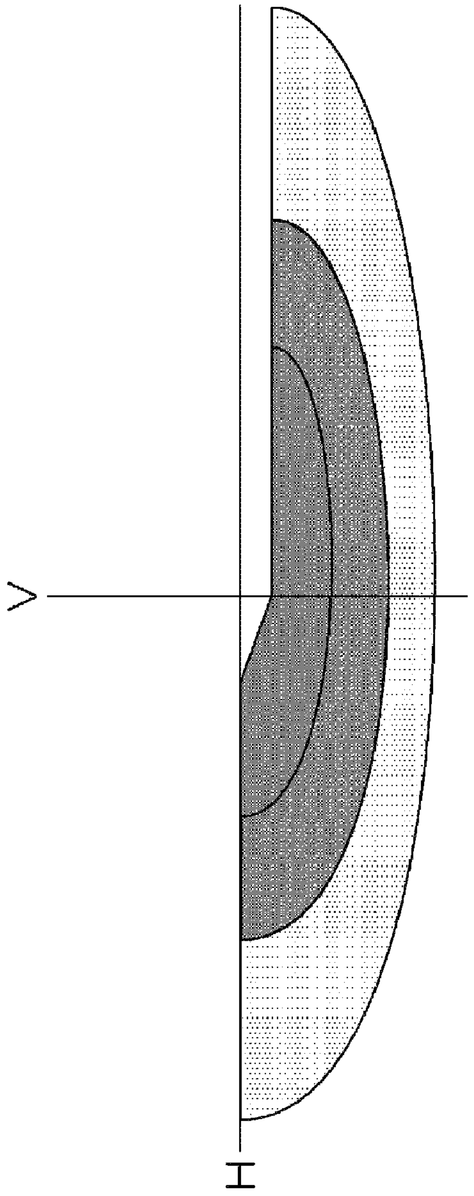
FIG. 17 is a diagram showing a general light distribution pattern for low beam, to which the presently disclosed subject matter can be applied.

In the present exemplary embodiment, the light distribution pattern formed by the vehicle headlamp 10 is exemplified as to have an upper bright/dark boundary line parallel to the horizontal line H as shown in FIG. 10 (A); however, the presently disclosed subject matter is not limited to this example. For example, the presently disclosed subject matter can be applied to the case as shown in FIG. 17, i.e., the case where a general light distribution pattern for low beam is adopted.

In the exemplary embodiment shown, light distribution sub-patterns PLA, PLB, PLC, and PLD corresponding to the respective optical units 12A, 12B, 12C, and 12D can be formed at positions lower than the horizontal line H, which indicates the height of the vehicle headlamp 10. The formed light distribution sub-patterns PLA, PLB, PLC, and PLD can be synthesized to provide an entire light distribution pattern of the vehicle headlamp 10.

Figure 11:
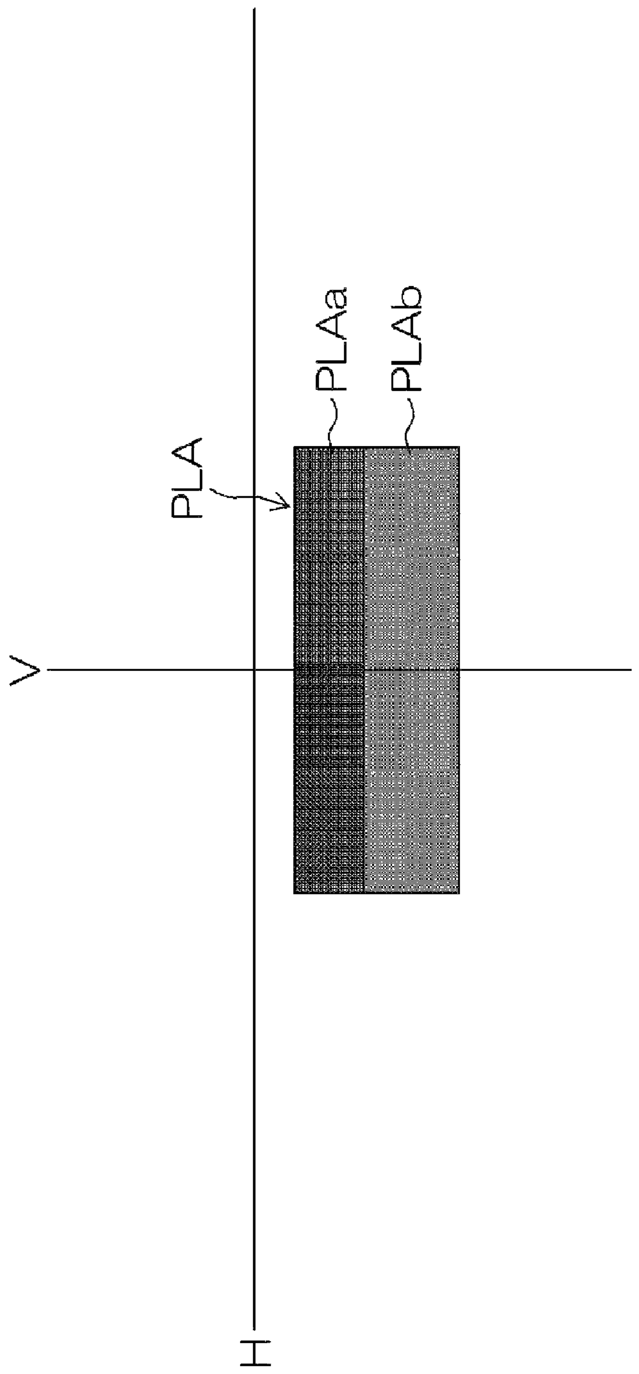
FIG. 11 is a diagram showing a light distribution pattern (sub-pattern) formed by a single optical unit.

As an example for describing the light distribution sub-patterns PLA, PLB, PLC, and PLD formed by the respective optical units 12A to 12D, FIG. 11 illustrates only the sub-pattern PLA obtained by the optical unit 12A. As shown in the drawing, the light distribution sub-pattern PLA can be composed of a boundary area PLAa at its upper side for forming the bright/dark boundary line which is the boundary between an area that is illuminated with light and an area that is not illuminated with light, and a light-distribution area PLAb that is illuminated with light other than the light for the boundary area PLAa.

The boundary area PLAa can correspond to an area that is illuminated with light while the bright/dark boundary line is not clear (or blurring). The light with which the boundary area PLAa is illuminated can contain parallel light that is part of the light projected by the optical unit 12A at the most upward angle (or around there). The height in the vertical direction of the area PLAa can be the same as that of the light emission area of the optical unit 12A. In this area PLAa, the luminance intensity is gradually increased from the upper edge of the area PLAa to the lower edge thereof.

On the other hand, the light distribution area PLAb can be freely designed (shape, size, luminance intensity) by designing the optical unit 12A according to a design specification.

Light distribution sub-patterns PLB, PLC, and PLD formed by the respective optical units 12B, 12C, and 12D can be formed in a similar manner to the above configuration of the sub-pattern PLA. As shown in FIG. 10 (A), the light distribution sub-patterns PLB, PLC, and PLD can include boundary areas PLBa, PLCa, and PLDa having the same vertical height as those of the light emission areas of the optical units 12B, 12C, and 12D, respectively, and light distribution areas PLBb, PLCb, and PLDb can be freely designed.

When the optical units 12A to 12D are arranged as shown in FIG. 7, the heights of the light emission areas of the respective optical units 12A to 12D are aligned with each other. Furthermore, the projecting angles of the light at the upper edges projected from the optical units 12A to 12D (namely, the light forming the respective light distribution sub-patterns PLA, PLB, PLC, and PLD) are the same. Accordingly, the boundary areas PLAa, PLBa, PLCa, and PLDa can be overlapped with each other at the same vertical position.

The resulting entire light distribution pattern of the vehicle headlamp 10 can show a luminous intensity distribution in a vertical cross-section as shown in FIG. 10 (B), formed on the V line indicating the left-to-right center of the vehicle headlamp 10. According to this configuration, there is no low luminance intensity area locally generated, and an ideal light distribution pattern can be formed without illuminance unevenness (uneven light distribution). Specifically, the boundary areas PLAa, PLBa, PLCa, and PLDa of the light distribution sub-patterns PLA, PLB, PLC, and PLD formed by the respective optical units 12A, 12B, 12C, and 12D, respectively, can be overlapped with each other. Here, the boundary areas PLAa, PLBa, PLCa, and PLDa may be the blurring areas of the bright/dark boundary line. Accordingly, there is no low luminance intensity area locally generated, and the blurring area of the bright/dark boundary line can be minimized in the entire light distribution pattern of the vehicle headlamp 10.

The light distribution patterns (areas) assigned to the respective optical units 12A to 12D are not limited to the above configuration. Furthermore, the light distribution sub-patterns PLA, PLB, PLC, and PLD formed by the respective optical units 12A to 12D are not limited to the above configuration. The light distribution patterns (areas) of the respective optical units 12A to 12D may not be formed by projecting light in the straight forward direction, but with an angle along the horizontal direction.

In the above first exemplary embodiment, the vehicle headlamp 10 can be configured to include four optical units 12A to 12D and the optical units 12A to 12D each can have a light emission area with the same shape and size. However, the presently disclosed subject matter is not limited to the case where four optical units are used, the case where the light emission areas have the same shape and size, and the like. Instead, various optical units (and shapes) can be employed. The following conditions can be met as conditions of the first exemplary embodiment. Specifically, the vehicle headlamp 10 can include a plurality (an arbitrary number) of optical units whose light emission areas are arranged such that within the largest vertical range of the light emission area of the optical unit the vertical ranges of the remaining light emission areas are arranged. Examples of such cases include cases where the upper edges, lower edges, or the center locations of the light emission areas of the respective optical units are positioned at the same height.

Figure 12:
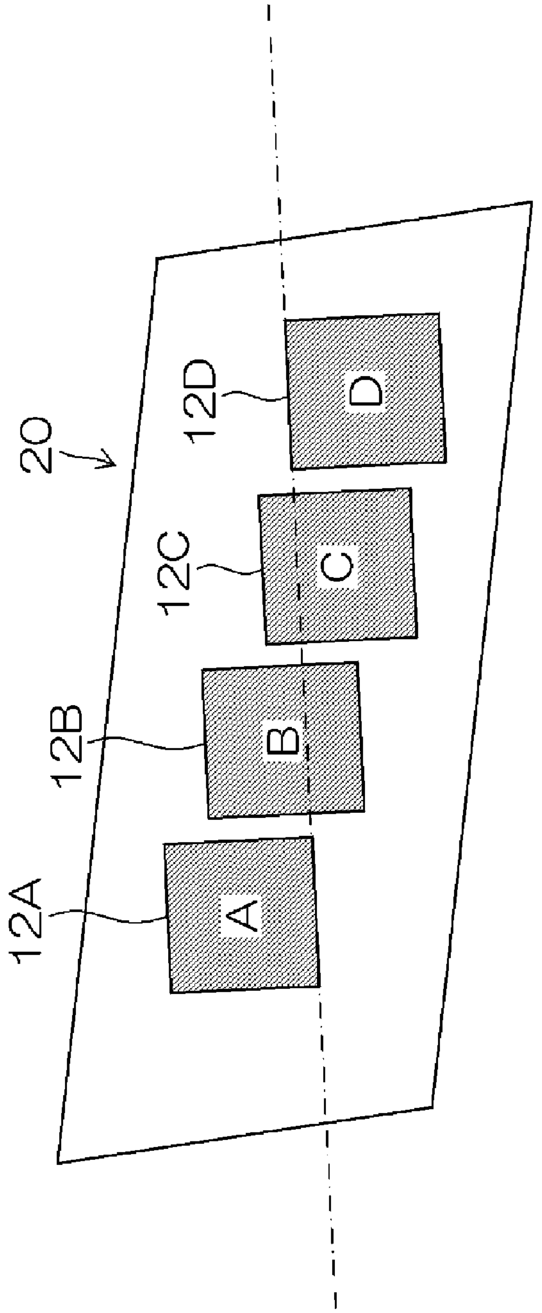
FIG. 12 is a front view illustrating another example of a vehicle headlamp for low beam, made in accordance with the principles of the presently disclosed subject matter, showing an arrangement of the optical units according to a second exemplary embodiment.

A description will now be given of a second exemplary embodiment of a vehicle headlamp for low beam made in accordance with the principles of the presently disclosed subject matter. FIG. 12 is a front view showing an arrangement of the optical units of the vehicle headlamp according to the second exemplary embodiment. The vehicle headlamp 20 shown in FIG. 12 can include the same optical units 12A to 12D as those of the vehicle headlamp 10 shown in FIG. 7, while the optical units 12A to 12D can each be arranged in a different height position with respect to each other, which is a different feature from the vehicle headlamp 10 of FIG. 7. In the illustrated example, the left end optical unit 12A can be disposed at the highest position, and the remaining optical units 12B to 12D can be disposed at positions that are successively lower than the adjacent left unit 12A to 12C, respectively.

Furthermore, as illustrated in FIG. 12, the lower edge of the light emission area of the highest optical unit 12A can be matched to the upper edge of the light emission area of the lowest optical unit 12D. Accordingly, the light emission areas of the optical units 12B and 12C are arranged within a vertical range from the upper edge of the light emission area of the highest optical unit 12A to the lower edge of the light emission area of the lowest optical unit 12D.

Figure 13:
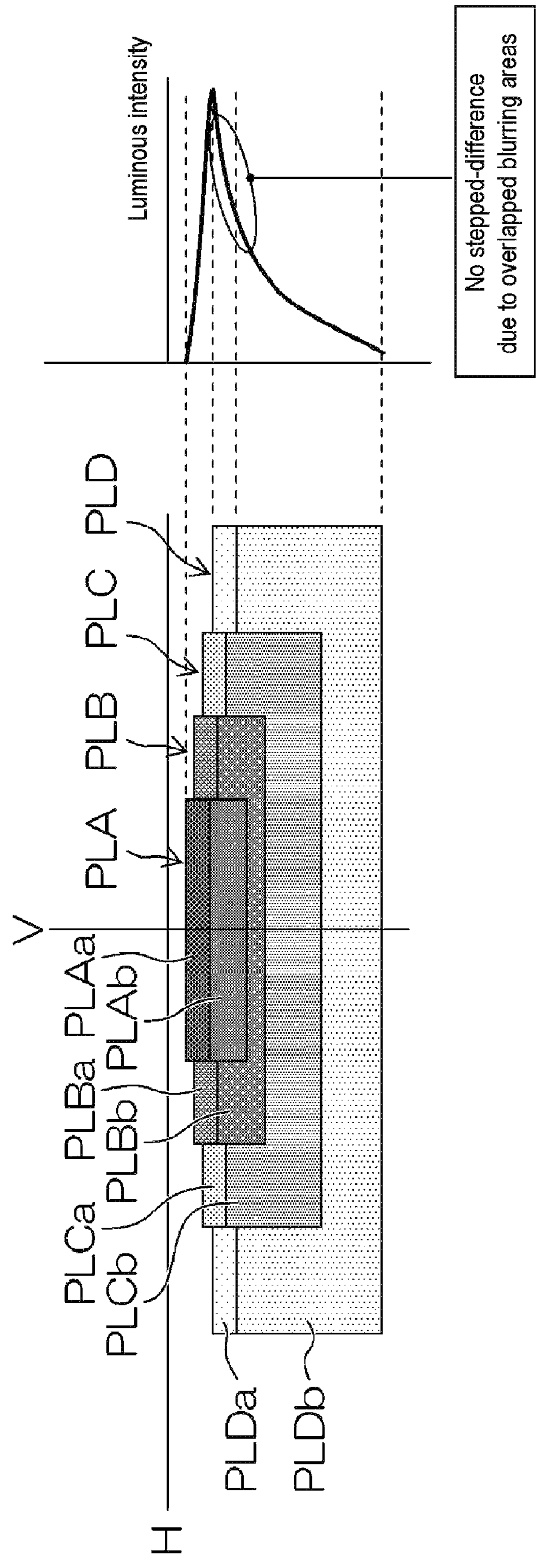
FIG. 13 is a diagram showing a light distribution pattern and a luminous intensity distribution in a vertical cross-section formed by the vehicle headlamp of FIG. 12.

FIG. 13 (A) depicts a diagram showing a light distribution pattern formed by the light projected by the vehicle headlamp 20 of FIG. 12 on a virtual vertical screen a predetermined distance away, for example, 25 meters away, from the vehicle headlamp. The respective optical units 12A to 12D of the vehicle headlamp 20 can project light at or below a certain projection angle as determined, for example, by a regulation for low-beam light distribution. For example, the light can be projected downward at 0.57 degrees or less with respect to the horizontal direction. Specifically, almost all the light forming the upper end area of the pattern, out of the light projected by the respective optical units 12A to 12D can be controlled so as to be projected downward at 0.57 degrees with respect to the horizontal direction.

In the shown exemplary embodiment, light distribution sub-patterns PLA, PLB, PLC, and PLD corresponding to the respective optical units 12A, 12B, 12C, and 12D can be formed at positions lower than the horizontal line H, which indicates the height of the vehicle headlamp 20, as in the previous embodiment illustrated in FIG. 10 (A). At the same time, corresponding to the difference in height of the light emission areas of the optical units 12A, 12B, 12C, and 12D, each of the light distribution sub-patterns PLA, PLB, PLC, and PLD can be formed at a different height position with respect to each other by the amount corresponding to the height difference of light emission areas of the optical units 12A, 12B, 12C, and 12D.

Furthermore, the lower edge of the boundary area PLAa of the light distribution sub-pattern PLA formed by the highest optical unit 12A can be matched to the upper edge of the boundary area PLDa of the light distribution sub-pattern PLD formed by the lowest optical unit 12D. Accordingly, the boundary areas PLBa and PLCa of the light distribution sub-patterns PLB and PLC formed by the optical units 12B and 12C, respectively, can be arranged within a range between the boundary areas PLAa and PLDa.

The resulting entire light distribution pattern of the vehicle headlamp 20 can show a luminous intensity distribution in a vertical cross-section as shown in FIG. 13(B), formed on the V line indicating the left-to-right center of the vehicle headlamp 20. According to this configuration, there is no low luminance intensity area locally generated, and an ideal light distribution pattern can be formed without illuminance unevenness (uneven light distribution).

The light distribution patterns (areas) assigned to the respective optical units 12A to 12D are not limited to the above configuration. Furthermore, the light distribution sub-patterns PLA, PLB, PLC, and PLD formed by the respective optical units 12A to 12D are not limited to the above configuration. The light distribution patterns (areas) of the respective optical units 12A to 12D may not be formed by projecting light in the straight forward direction, but with an angle along the horizontal direction.

In the above second exemplary embodiment, the vehicle headlamp 20 can be configured to include four optical units 12A to 12D and the optical units 12A to 12D each can have a light emission area with the same shape and size. However, the presently disclosed subject matter is not limited to the case where four optical units are used, the case where the light emission areas have the same shape and size, and the like, but various optical units can be employed. The following conditions can be met as conditions of the second exemplary embodiment. Specifically, the vehicle headlamp 20 can include a plurality (an arbitrary number) of optical units in which the light emission area with its upper edge disposed at the highest position and the light emission area with its lower edge disposed at the lowest position out of the light emission areas of the optical units in the vertical direction can be arranged so that the ranges of these light emission areas as defined in a vertical direction of the light emission areas can form a single range continuous in the vertical direction, and the light emission areas of the remaining optical units can be arranged so that the vertical ranges of the light emission areas thereof are disposed within the continuous range. The conditions of the second exemplary embodiment can exclude the range where the conditions of the first exemplary embodiment are met. Note that, when the highest light emission area has the lower edge below, or the same as, the upper edge of the lowest light emission area in terms of vertical position, it is said that the vertically continuous range can be formed by these light emission areas.

When a plurality of optical units are configured such that the light emission areas are arranged to meet the conditions of the second exemplary embodiment, the blurring range of the bright/dark boundary line in the entire light distribution pattern of the vehicle headlamp 20 is larger than the first exemplary embodiment. Accordingly, this configuration can prevent luminance unevenness due to the overlapping of the blurring ranges of the light distribution sub-patterns of the respective optical units.

Figure 14:
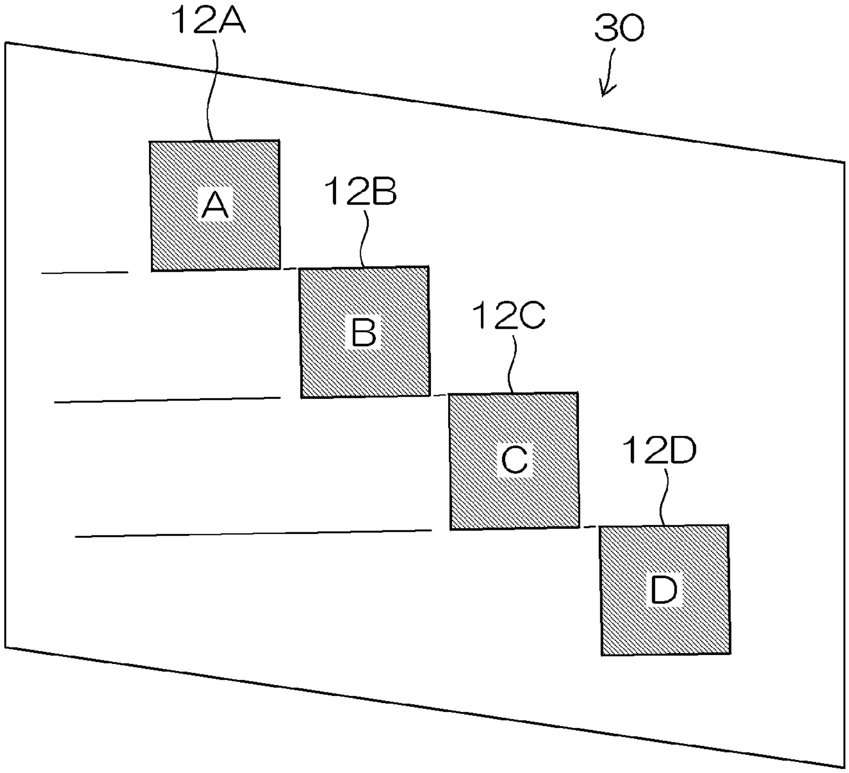
FIG. 14 is a front view illustrating an example of a vehicle headlamp for low beam, made in accordance with the principles of the presently disclosed subject matter, showing an arrangement of the optical units according to a third exemplary embodiment.

A description will now be given of a third exemplary embodiment of a vehicle headlamp for low beam made in accordance with the principles of the presently disclosed subject matter. FIG. 14 is a front view showing an arrangement of optical units of the vehicle headlamp according to the third exemplary embodiment. The vehicle headlamp 30 as shown in FIG. 14 can include the same optical units 12A to 12D as those of the vehicle headlamps 10 and 20 shown in FIGS. 7 and 12, while the optical units 12A to 12D can be arranged in a different height position, which is a different feature as compared to the vehicle headlamp 20 of FIG. 12. In the illustrated example, the left end optical unit 12A can be disposed at the highest position, and the remaining optical units 12B to 12D can be disposed at positions that are successively lower as compared to the adjacent left unit 12A to 12C, respectively.

In the present exemplary embodiment, different from the arrangement of the optical units 12A to 12D of the vehicle headlamp 20 of FIG. 12, the light emission area of the highest optical unit 12A is not continuous or overlapping in terms of vertical position with the light emission area of the lowest optical unit 12D.

However, the light emission areas of the optical units 12A to 12D can be arranged so as to be continuous in terms of vertical position, wherein the vertical position of the lower edge of the light emission area of the optical unit 12A is matched to that of the upper edge of the light emission area of the optical unit 12B, the vertical position of the lower edge of the light emission area of the optical unit 12B is matched to that of the upper edge of the light emission area of the optical unit 12C, and the vertical position of the lower edge of the light emission area of the optical unit 12C is matched to that of the upper edge of the light emission area of the optical unit 12D.

Figure 15:
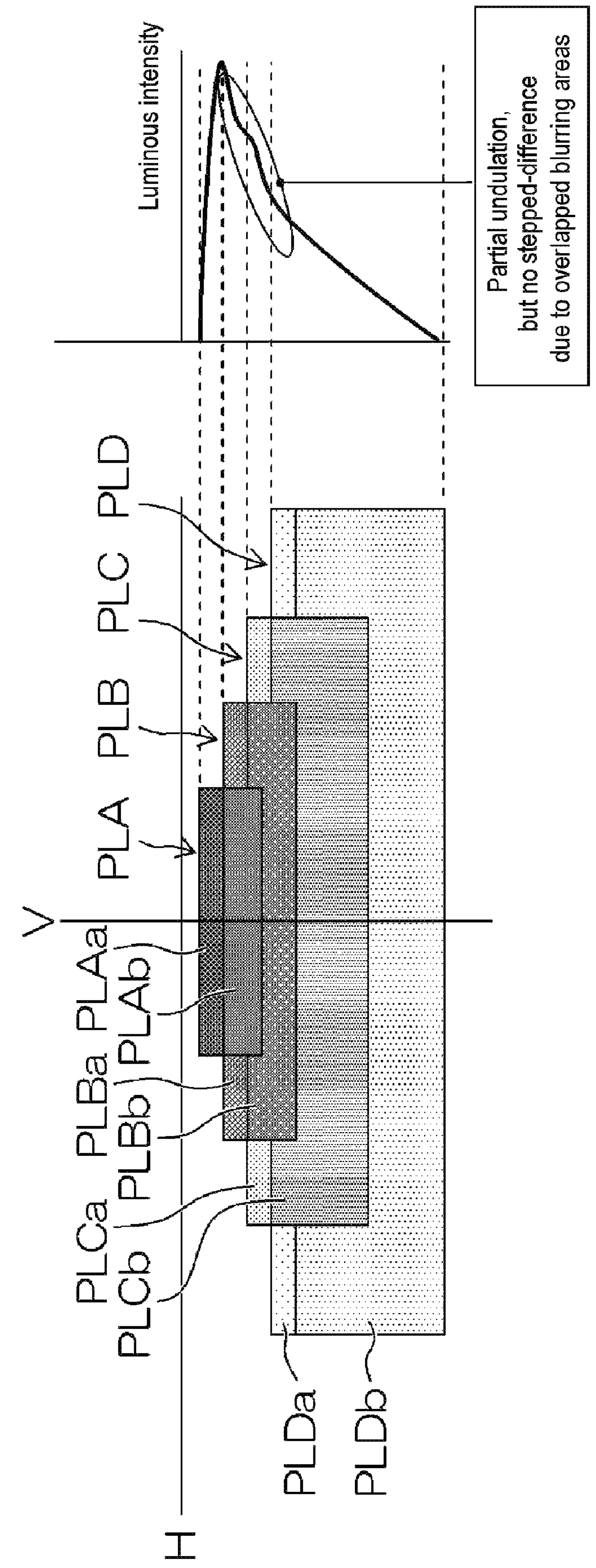
FIG. 15 is a diagram showing a light distribution pattern and a luminous intensity distribution in a vertical cross-section formed by the vehicle headlamp of FIG. 14.

FIG. 15 (A) is a diagram showing a light distribution pattern formed by the light projected by the vehicle headlamp 30 of FIG. 14 on a virtual vertical screen a predetermined distance away, for example, 25 meters away, from the vehicle headlamp. The respective optical units 12A to 12D of the vehicle headlamp 30 can project light at or below a certain projection angle as determined by a regulation or the like for a low-beam light distribution. For example, the light can be projected downward at 0.57 degrees or less with respect to the horizontal direction. Specifically, almost all the light forming the upper end area of the pattern out of the light projected by the respective optical units 12A to 12D can be controlled so as to be projected downward at 0.57 degrees with respect to the horizontal direction.

In the shown exemplary embodiment, light distribution sub-patterns PLA, PLB, PLC, and PLD corresponding to the respective optical units 12A, 12B, 12C, and 12D can be formed at positions lower than the horizontal line H, which indicates the height of the vehicle headlamp 30, as in the previous embodiment illustrated in FIG. 10 (A). At the same time, corresponding to the difference in height of the light emission areas of the optical units 12A, 12B, 12C, and 12D, the light distribution sub-patterns PLA, PLB, PLC, and PLD can each be formed at a different height position by the amount corresponding to the height difference of light emission areas of the optical units 12A, 12B, 12C, and 12D.

Furthermore, the vertical position of the lower edge of the boundary area PLAa of the light distribution sub-pattern PLA can match that of the upper edge of the boundary area PLBa of the light distribution sub-pattern PLB, the vertical position of the lower edge of the boundary area PLBa of the light distribution sub-pattern PLB can match that of the upper edge of the boundary area PLCa of the light distribution sub-pattern PLC, and the vertical position of the lower edge of the boundary area PLCa of the light distribution sub-pattern PLC can match that of the upper edge of the boundary area PLDa of the light distribution sub-pattern PLD.

The resulting entire light distribution pattern of the vehicle headlamp 30 can show a luminous intensity distribution in a vertical cross-section of FIG. 15 (B), formed on the V line indicating the left-to-right center of the vehicle headlamp 30. According to this configuration, although the luminance intensity may include partial undulation, there can be little or no low luminance intensity area locally generated, and an ideal light distribution pattern can be formed without illuminance unevenness (uneven light distribution).

The light distribution patterns (areas) assigned to the respective optical units 12A to 12D are not limited to the above configurations. Furthermore, the light distribution sub-patterns PLA, PLB, PLC, and PLD formed by the respective optical units 12A to 12D are not limited to the above configuration. The light distribution patterns (areas) of the respective optical units 12A to 12D may not be formed by projecting light in the straight forward direction, but with an angle along the horizontal direction.

Figure 16:
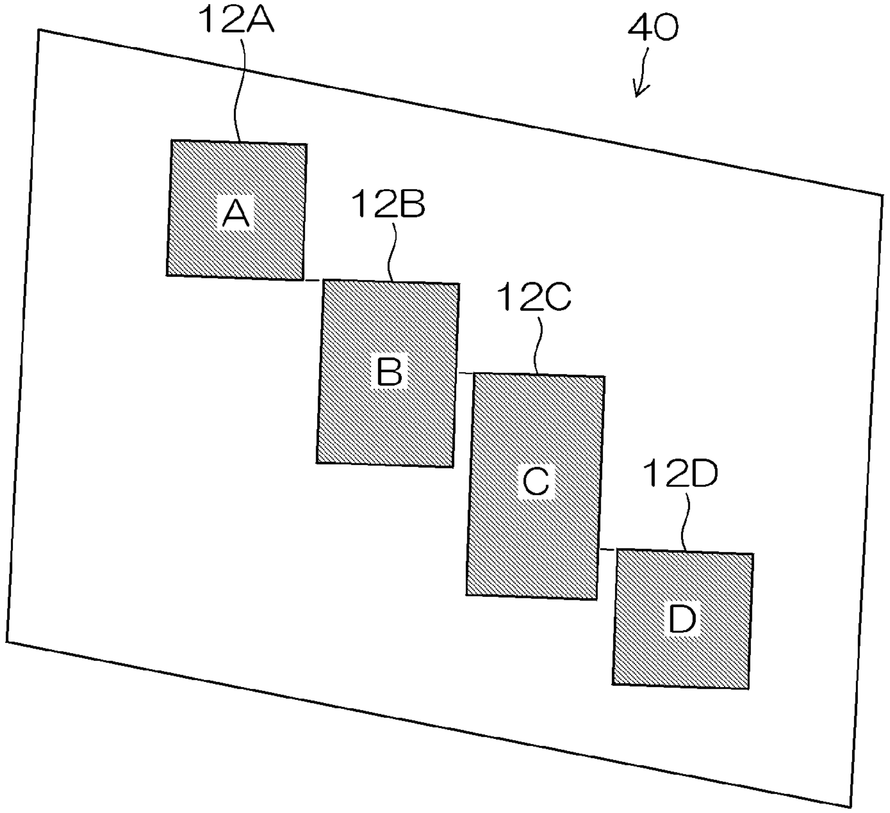
FIG. 16 is a front view illustrating a modified example of the third exemplary embodiment of the vehicle headlamp.

In the above third exemplary embodiment, the vehicle headlamp 30 can be configured to include four optical units 12A to 12D and the optical units 12A to 12D can each have a light emission area with the same shape and size. However, the presently disclosed subject matter is not limited to the case where four optical units are used, the case where the light emission areas have the same shape and size, and the like. Instead, various optical units can be employed. The following conditions can be met as conditions of the third exemplary embodiment. Specifically, the vehicle headlamp 30 can include a plurality (an arbitrary number) of optical units whose light emission areas are arranged such that vertical ranges of the light emission areas can form a single continuous vertical range. The conditions of the third exemplary embodiment can exclude the range where the conditions of the second exemplary embodiment are met. For example, FIG. 16 is a front view illustrating a modified example of the present exemplary embodiment, wherein a vehicle headlamp 40 can include four optical units 12A to 12D with different vertical sizes for respective light emission areas. Even in this case, these light emission areas can be arranged so that vertical ranges of the light emission areas can form a single continuous vertical range, so that luminance unevenness can be prevented from being generated.

When a plurality of optical units are configured such that the light emission areas are arranged to meet the conditions of the third exemplary embodiment, the blurring range of the bright/dark boundary line in the entire light distribution pattern of the vehicle headlamp 30 (or the vehicle headlamp 40) can be larger than the first and second exemplary embodiments. Accordingly, this configuration can prevent luminance unevenness because the blurring ranges of the light distribution sub-patterns of the respective optical units are not separated away from each other in the vertical direction.

The above configurations of the vehicle headlamps according to the respective exemplary embodiments can be applied to a light for use in motor cycles, automobiles, electric trains, and other vehicles, and the light is not limited to a headlamp, but can be a fog lamp, or other types of vehicle lights.

Figure 18:
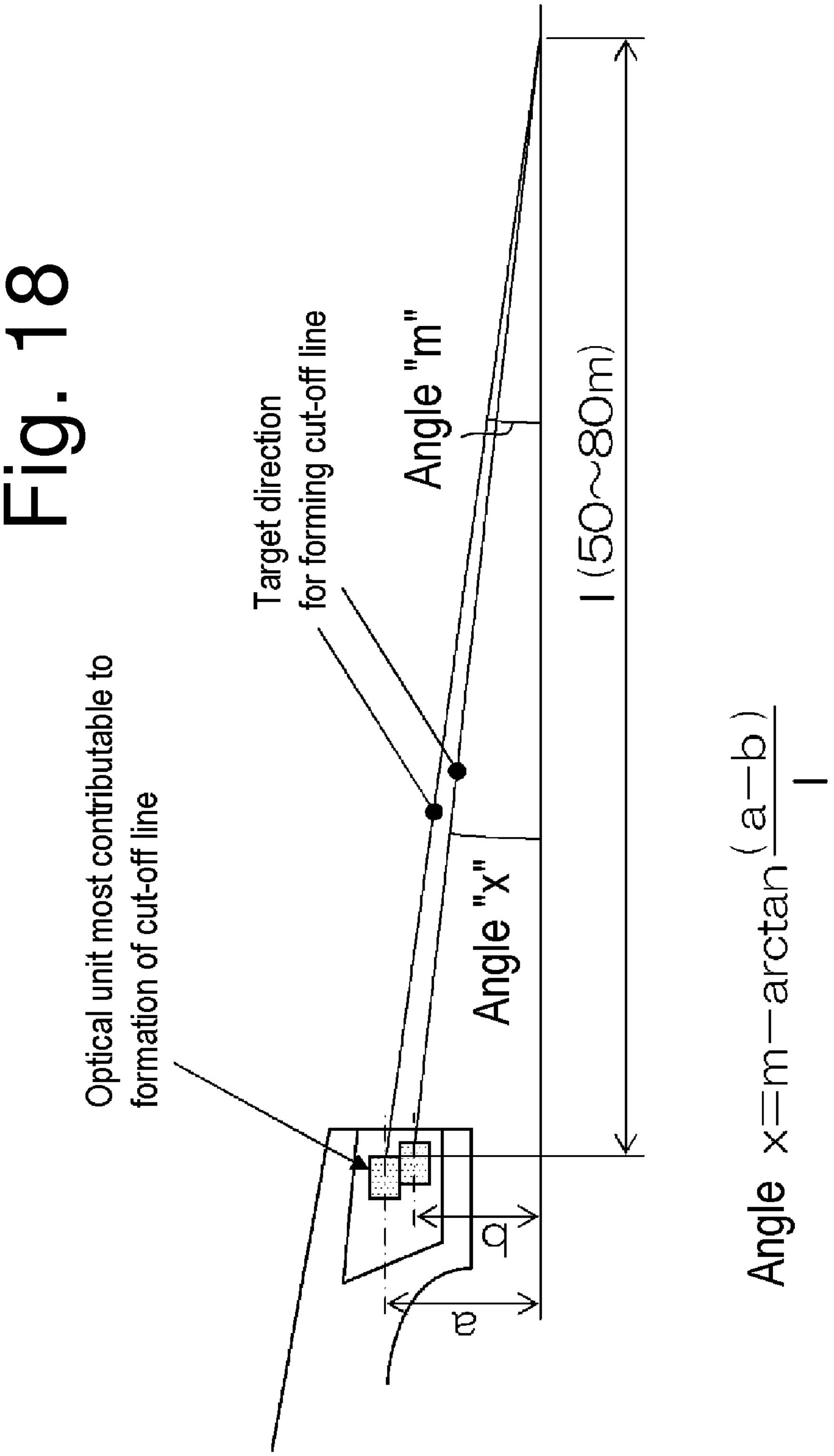
FIG. 18 is a diagram illustrating how the respective optical units are disposed such that the light beams forming the upper ends of the light distribution pattern can be projected at an angle so as to illuminate a road surface at the same position.

In the present exemplary embodiments described above, almost all the light forming the upper end area of the light distribution pattern (sub-pattern formed by each optical unit) out of the light projected by the respective multiple optical units (being the uppermost light) can be controlled so as to be projected at the same angle. However, the presently disclosed subject matter is not limited to these particular embodiments. The projecting angle of light forming the upper end area of the sub-pattern formed by each optical unit can be set based on the height of the light emission area of the optical unit from the road surface such that the road surface that is a predetermined distance (for example 50 to 80 meters) away from the vehicle light in the front direction with the light forming the upper end area. Specifically, as shown in FIG. 18, the projection angle x of light forming the upper end area of a light distribution sub-pattern formed by an optical unit, the light emission area of which is disposed at a height of b (unit: meter), can be represented by the following equation (1), $$x=m-\arctan\{(a-b)/1\} \quad (1),$$

wherein a (unit: meter) represents the height of the light emission area of an optical unit which contributes to form the upper end area of the light distribution pattern with the highest level, 1 (unit: meter) represents the distance between the light emission area and the road surface that is illuminated with the light forming the upper end area of the light distribution sub-pattern formed by the subject optical unit, and m represents the projection angle of that light. Furthermore, the blurring areas of the bright/dark boundary lines of the light distribution sub-patterns formed by the respective optical units may be overlapped with each other at the road surface "1" meters away from the vehicle light.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising:

a plurality of optical units each utilizing a semiconductor light emitting device as a light source, wherein respective optical units form light distribution sub-patterns that are superposed to form a light distribution pattern for low beam, wherein the respective optical units have light emission areas arranged in a width direction of a vehicle body to project light from respective light emission areas so that the light emission areas are not overlapped with each other, wherein the light emission areas of the optical units are arranged so that ranges of the light emission areas as defined in a vertical direction of the light emission areas form a single range continuous in the vertical direction, wherein the vehicle light includes only the respective optical units, and wherein an uppermost edge of a first of the optical units is located at a first highest position, and an uppermost edge of each remaining optical unit is located at a successively lower position in a vertical direction as compared to an adjacent uppermost edge position.

2. The vehicle light according to claim 1, wherein an uppermost light emission area and a lowermost light emission area out of the light emission areas of the optical units in the vertical direction are arranged so that a range of these light emission areas as defined in a vertical direction of the light emission areas form a single range continuous in the vertical direction, and wherein remaining optical units other than the optical units having the uppermost and lowermost light emission areas are arranged so that vertical ranges of the light emission areas of the remaining optical units are disposed within the single range continuous in the vertical direction.

3. The vehicle light according to claim 1, wherein the optical units are arranged so that the light emission areas of the optical units are arranged in line in the width direction of the vehicle light within a vertical range limited by the uppermost light emission area and the lowermost light emission area.

4. The vehicle light according to claim 2, wherein the optical units are arranged so that the light emission areas of the optical units are arranged in line in the width direction of the vehicle light within a vertical range limited by the uppermost light emission area and the lowermost light emission area.

5. A vehicle light comprising:

a plurality of optical units each utilizing a semiconductor light emitting device as a light source, wherein respective optical units form light distribution sub-patterns that are superposed to form a light distribution pattern for low beam, wherein the respective optical units have light emission areas arranged in a width direction of a vehicle body to project light from respective light emission areas so that the light emission areas are not overlapped with each other, wherein the light emission areas of the optical units are arranged so that ranges of the light emission areas as defined in a vertical direction of the light emission areas form a single range continuous in the vertical direction, wherein the vehicle light includes only the respective optical units, and wherein an uppermost edge of each of the optical units is one of, co-linear with a lowermost edge of a remaining one of the optical units, and intersecting with a mid-portion located between an uppermost edge and a lowermost edge of a remaining one of the optical units.

6. A vehicle light comprising:

a plurality of optical units each utilizing a semiconductor light emitting device as a light source, wherein respective optical units form light distribution sub-patterns that are superposed to form a light distribution pattern for low beam, wherein the respective optical units have light emission areas arranged in a width direction of a vehicle body to project light from respective light emission areas so that the light emission areas are not overlapped with each other, wherein the light emission areas of the optical units are arranged so that ranges of the light emission areas as defined in a vertical direction of the light emission areas form a single range continuous in the vertical direction, wherein the vehicle light includes only the respective optical units, and wherein an uppermost edge of a portion of the optical units is located in a co-linear relationship with a lowermost edge of an adjacent one of the optical units.

7. A vehicle light comprising:

a pre-set number of optical units each utilizing a semiconductor light emitting device as a light source, wherein all optical units form light distribution sub-patterns that are superposed to form a light distribution pattern, wherein all optical units have light emission areas arranged in a width direction to project light from respective light emission areas so that the light emission areas are completely separated by a space from each other, wherein the light emission areas of all optical units are arranged so that ranges of the light emission areas as defined in a vertical direction of the light emission areas form a single range continuous in the vertical direction, and wherein an uppermost edge of each of the optical units is one of, collinear with a lowermost edge of a remaining one of the optical units, and intersecting with a mid-portion located between an uppermost edge and a lowermost edge of a remaining one of the optical units.

8. The vehicle light according to claim 7, wherein an uppermost light emission area and a lowermost light emission area out of the light emission areas of the optical units in the vertical direction are arranged so that a range of these light emission areas as defined in a vertical direction of the light emission areas form a single range continuous in the vertical direction, and wherein remaining optical units other than the optical units having the uppermost and lowermost light emission areas are arranged so that vertical ranges of the light emission areas thereof are disposed within the single range continuous in the vertical direction.

9. The vehicle light according to claim 7, wherein the optical units are arranged so that the light emission areas of the optical units are arranged in line in the width direction of the vehicle light within a vertical range limited by the uppermost light emission area and the lowermost light emission area.

10. A vehicle light comprising:

a pre-set number of optical units each utilizing a semiconductor light emitting device as a light source, wherein all optical units form light distribution sub-patterns that are superposed to form a light distribution pattern, wherein all optical units have light emission areas arranged in a width direction to project light from respective light emission areas so that the light emission areas are completely separated by a space from each other, wherein the light emission areas of all optical units are arranged so that ranges of the light emission areas as defined in a vertical direction of the light emission areas form a single range continuous in the vertical direction, and wherein an uppermost edge of a first of the optical units is located at a first highest position, and an uppermost edge of each remaining optical unit is located at a successively lower position in a vertical direction as compared to an adjacent uppermost edge position.

11. The vehicle light according to claim 6, wherein an uppermost edge of a portion of the optical units is located in a co-linear relationship with a lowermost edge of an adjacent one of the optical units.

* * * * *